United States Patent Office 3,777,006
Patented Dec. 4, 1973

3,777,006
PROCESS FOR PREPARING ZEOLITIC BODIES HAVING HIGH STRENGTH CHARACTERISTICS
Clark A. Rundell, Silver Spring, and Carl V. McDaniel, Laurel, Md., assignors to W. R. Grace & Co., New York, N.Y.
No Drawing. Continuation-in-part of abandoned application Ser. No. 868,568, Oct. 22, 1969. This application Jan. 21, 1972, Ser. No. 219,837
Int. Cl. C10b *33/28;* B01j *11/40*
U.S. Cl. 423—118
2 Claims

ABSTRACT OF THE DISCLOSURE

A process for preparing zeolitic bodies having a size in excess of 200 microns, high strength characteristics and excellent adsorptive properties by preparing clay bodies in the desired size range, treating the clay bodies in a sodium silicate solution and heating the formed bodies in the solution until crystallization is complete.

---

This case is a continuation-in-part of U.S. Ser. No. 868,568, now abandoned.

This invention relates to the production of crystalline aluminosilicates more commonly referred to as molecular sieves. More specifically, it relates to the preparation of formed zeolite bodies having a size in excess of 200 microns and characterized by high strength characteristics and excellent adsorptive properties.

Several zeolite materials, commonly referred to as molecular sieves, are described in the patent and technical literature. At least 20 of these zeolitic crystalline aluminosilicates have been prepared that have different silica to alumina ratios and different adsorptive properties. Two of the zeolites are the most interesting. They include the materials referred to by the Linde Division of Union Carbide as Type A molecular sieves, described in U.S. Pat. 2,882,242, which has a silica-alumina ratio of about 2.

Another important group of these zeolitic materials is the faujasites. Faujasite is a naturally occurring aluminosilicate having a characteristic X-ray structure. The synthetic materials designated Zeolite X and Zeolite Y by the Linde Division of Union Carbide Corporation are commonly referred to as synthetic faujasites. Zeolite Y is described in U.S. Pat. 3,130,007 and is generally similar to Zeolite X described in U.S. Pat. 2,882,243. The emperical formula for Zeolite Y given in U.S. Pat. 3,130,007 is as follows:

$$0.9 \pm 0.2 Na_2O : Al_2O_3 : wSiO_2 : xH_2O$$

wherein $w$ has a value of greater than 3 and up to about 6 and $x$ may have a value as high as 9.

This phase of faujasite is distinguished from the type X zeolite by the silica-alumina ratio. The silica-alumina ratio affects the important physical properties of the faujasite. Synthetic faujasite having a silica to alumina molar ratio in excess of 4.5, for example, has a greater thermal stability than the same faujasite having a lower silica to alumina ratio.

All of these materials have outstanding adsorptive properties. Type X and Type Y zeolites are also now frequently used as components of petroleum cracking catalysts.

There are several prior art methods and processes for preparing these molecular sieve materials. The sodium form of the zeolite is prepared from dilute reactants and the reactant mass is filtered to remove the zeolite crystals from the mother liquor. The composition of the reaction mixture is varied depending on the type of zeolite being prepared; and in the case of faujasite, the source of silica that is used. As reported in U.S. Pat. 2,882,243, Type A zeolite can be obtained if the reaction mixture has a composition in the following range:

| | |
|---|---|
| $Na_2O/SiO_2$ | 0.8–3.0 |
| $SiO_2/Al_2O_3$ | 1.3–2.5 |
| $H_2O/Na_2O$ | 35–200 |

It has been reported in U.S. Pat. 2,882,244 that the sodium form of Zeolite X can be prepared essentially free of contaminating materials from a reactant mixture which composition falls within the following range:

| | |
|---|---|
| $Na_2O/SiO_2$ | 1.2–1.5 |
| $SiO_2/Al_2O_3$ | 3–5 |
| $H_2O/Na_2O$ | 30–50 |

When aqueous colloidal silica sol or reactive amorphous silica sol is used as the silica source, it has been reported that Zeolite Y can be obtained if the reactant mixture has a composition in the following range:

| | |
|---|---|
| $Na_2O/SiO_2$ | 0.4–6 |
| $SiO_2/Al_2O_3$ | 15–25 |
| $H_2O/Na_2O$ | 20–50 |

When these zeolitic materials are used as adsorbents, it is frequently desirable to have the particles in a relatively large size range, i.e., above about 200 microns. Use of particles in this size range solves several of the problems inherent in adsorbent systems. When a very fine size material is used, for example, it is difficult to keep the bed from packing and channeling and to maintain the desired adsorptive properties of the zeolitic material.

In order for the products to be useful in an adsorptive system, they must have a high crush strength and a good resistance to abrasion. Typically, the particles must have a crush strength (as determined by Standard ASTM methods) in excess of about 5 pounds and a Davison Attrition index, as measured by the well known Roller test of less than 10, to prevent excessive loss of the material due to grinding of the particles against each other in the adsorption process.

We have found that formed bodies having a size in excess of 200 microns, a high resistance to attrition and high crush strength can be prepared from an inexpensive source bodies in the desired size range. When the zeolite is a of silica and alumina. In our process, we form clay into Type A zeolite, the clay provides alumina and all the silica. When the faujasites are prepared, the clay provides the alumina and a portion of the silica necessary to prepare the product. The novel feature of this invention resides in the addition of nucleation centers to the metakaolin after forming or as a component of the liquid reactant mixture used to crystallize the zeolite.

In one embodiment, our process comprises forming metakaolin into bodies in the desired size range. This forming can be done by any of the conventional techniques such as prilling, etc. The essence of the invention resides in the conversion of the clay in these bodies to zeolites in a sodium silicate solution if a faujasite type zeolite is prepared, or a sodium hydroxide solution if the zeolite prepared is Type A zeolite. The formed bodies are added to a sodium silicate solution containing the nucleation centers, crystallized and the crystals separated and washed.

The nucleation centers are small particles that may be either amorphous or crystalline. They are prepared by a special technique. The method of preparing these seeds is not part of this invention. It has been disclosed in a previous application. Broadly, the method of preparing the crystalline seeds comprises mixing solutions of sodium aluminate, sodium silicate, and sodium hydroxide in the desired proportions. These solutions are then cooled at 0° C. and aged. The temperature of the mixture is then allowed to increase to about room temperature and the mixture is aged without stirring at room temperature for about 16 hours. At the end of this time, the nucleation centers may be crystallized by heating the mixture at 90–100° C. for 6 hours.

The amorphous seeds are prepared in a similar manner except that the heating period is eliminated and the aging period is greatly reduced. The nucleation centers are between 0.01 and 0.05 microns in size.

In our process, the nucleation centers may be added to the metakaolin before it is formed into bodies of the desired size and shape. Alternatively, the nucleation sites may be included in the sodium silicate-sodium hydroxide solution from which the clay is crystallized into the zeolite.

The clay used is a kaolin clay that has been calcined to convert it to metakaolin. This conversion is effected by calcination of raw kaolin clay to a temperature of 1200 to 1500° F. for a period of 10 minutes to 10 hours. This conversion to metakaolin may be carried out before the kaolin is formed into bodies in the desired size range. However, it is, of course, possible to convert the clay to metakaolin after it has been formed.

The solution used for crystallization would, of course, depend on the type of zeolite being prepared. Where faujasite is being prepared, the formed bodies are crystallized in a sodium silicate solution.

The preparation of Type Y zeolite requires the addition of more silica. In this case, the sodium silicate used, of course, depends on the silica-alumina ratio desired in the final product.

Although any alkali metal silicate would give satisfactory results, the zeolites are normally prepared in the sodium form. Since this is the case, the silicate normally used is a commercially available sodium silicate having a $SiO_2$ to $Na_2O$ ratio of 3.3:1 to 3.4:1. This silicate is diluted with water when necessary to provide the silicate solution having the desired concentration. Additional $Na_2O$ may be added as NaOH.

As stated above, the nucleation centers may be added to the silicate solution. They may, however, be incorporated with the formed clay bodies. The nucleation centers are prepared in accordance with the processes described in Examples 1 and 2 of the instant application. The centers are normally added in the concentration of about 0.1 to about 10% by weight of the product.

While the centers are normally added as from about 0.1 to 10 weight percent (based on the weight of the final theoretical yield of the zeolite product), it should be understood that an excess of 10% of the weight of the nucleation centers may be utilized to obtain similar results. However, an amount of centers in excess of 10% does not increase the rate of zeolite production or improve the desired properties in proportion to the economic value of the additional nucleation centers.

The crystallization of the formed clay bodies to zeolites in the silicate solution is normally carried out at a temperature of about 60–110° C. until crystallization occurs, generally for a period ranging from 10 minutes to 30 hours. The reaction may be conducted at relatively uniform temperatures or if desired, may be conducted at a series of different temperatures. Thus, the slurry may be first aged at a temperature of from about 25 to 40° C. for a period of two minutes to 24 hours and subsequently heated to a higher temperature, about 40–110° C. for a period of about 10 minutes to 30 hours. It is also to be understood that the reaction may be conducted when the temperature is continuously varied.

Subsequent to the reaction, the resultant crystalline product is recovered by any convenient technique which may involve separation of the reactant solution from the formed bodies by filtration followed by washing to remove excess sodium silicate. The product is then dried and may be converted to a catalytically active form if it is to be used as a catalyst or catalyst component.

Our invention is further illustrated by the following specific but non-limiting examples.

EXAMPLE 1

This example describes a process for preparing zeolite nucleation centers. A 29 gram portion of sodium aluminate ($Na_2O:Al_2O_3:3H_2O$) was dissolved in 368 grams of water. A sodium silicate soluton comprising 420 grams of sodium silicate (28.5% $SiO_2$:8.7% $Na_2O$); 112 grams of NaOH and 100 grams of $H_2O$ were prepared. These solutions were cooled to 0° C., mixed and aged with stirring for 1 hour to 0° C. The mixture was then aged without stirring at 20° C. for 16 hours. The mixture was heated to 100° C. for 6 hours and the product was recovered by filtration and washed. The product possessed a crystalline structure of Type X zeolite and a silica-alumina ratio of about 2.5. The particle size of the product was between 0.01 and 0.05 microns. The nitrogen surface area was 720 square meters per gram.

EXAMPLE 2

This example illustrates the process of preparing amorphous nucleation centers. A 290 gram quantity of sodium aluminate was dissolved in 2 liters of water. A sodium silicate solution was made up by dissolving 1120 grams of sodium hydroxide and 2680 grams of water and 4200 grams of sodium silicate solution containing 28% $SiO_2$ was added. The sodium aluminate solution was mixed with sodium hydroxide-sodium silicate solution. The resulting solution was cooled to 15° and aged without stirring for 16 hours. At the end of this time, the slurry of amorphous nucleation centers was ready for use in subsequent preparation procedures.

EXAMPLE 3

This example illustrates the process for preparing the zeolites in nodular form using metakoalin as the starting material.

A total of 66 grams of kaolin that had been previously calcined at 1300° F. to convert it to metakaolin was mixed to 213 grams of sodium silicate solution having a $Na_2O$ to $SiO_2$ ratio of about 3.3:1. The mixture was aged for a period of about 24 hours.

At the end of this time, about 75% of the clay-silicate mixture was in the form of nodules. Some of these nodules had diameters of up to ½″. A solution was prepared to contain 20 grams of sodium hydroxide and 350 grams of sodium silicate having an $Na_2O/SiO_2$ ratio of 3.3 to 1, in 350 grams of deionized water. This solution was added to the nodules of the clay silicate product.

The mixture was stirred rapidly for a few minutes and heated to 100° C. A total of 40 ml. of the slurry prepared according to the process of Example 2, was added to the mixture and the mixture was stirred for about 5 minutes. The slurry was then heated to a temperature of 105° C. for a period of about 36 hours. The surface area of the product at the end of this time was determined and found to be 919 square meters per gram.

Increasing the heating time to 60 hours, did not result in any improvement of the surface area of the product. A sample of the product was submitted for X-ray analysis. The X-ray diffraction pattern showed the product was a faujasite having a silica to alumina ratio of greater than 5.0.

EXAMPLE 4

This example covers the method of preparing the zeolite precursor as spheres having diameters of about ⅛ to ¼ inch.

A total of 33 grams of calcined kaolin was mixed with 50 grams of sodium silicate, having an $Na_2O$ to $SiO_2$ ratio of 3.3 to 1, in a laboratory mixer. The clay-formed spheres were allowed to air dry for a period of about 16 hours. At the end of this time, a slurry containing 100 grams of sodium silicate, 6.3 grams of sodium hydroxide in 43 grams of water and 20 ml. of the nucleation center slurry prepared according to the process described in Example 2 was prepared. This slurry was mixed with the spheres and then heated to 105° C. After heating for 31 hours at this temperature, a sample was removed, filtered, washed, and calcined at 1000° F. The surface area of the product was 850 square meters per gram.

A sample was submitted for X-ray and found to have the X-ray diffraction pattern of faujasite with a silica to alumina ratio of greater than 5.

EXAMPLE 5

In this example, spheres of a zeolite having the faujasite structure and a silica to alumina ratio of about 2.5 was prepared.

A total of 33.3 grams of calcined kaolin was mixed with 45 grams of sodium silicate having a $Na_2O$ to $SiO_2$ ratio of 3.3 to 1 by gradually adding the sodium silicate to the clay. Spheres about 1/8 to 1/4 inch in diameter were formed. The spheres were allowed to air dry. A solution was prepared to contain 46.9 grams of sodium hydroxide and 20 ml. of the nucleation center slurry according to the process described in Example 2 in 470 grams of deionized water. This mixture was added to the spheres. After 48 hours, the surface area of the product was 750 square meters per gram. The X-ray diffraction pattern showed the product was a faujasite type zeolite having a silica to alumina ratio of about 2.5

EXAMPLE 6

This example covers the preparation of the faujasite type zeolite from extruded clay particles.

A total of 66 grams of a commercially available clay in extruded form was calcined at a temperature of 1300° F. The clay was in the form of short extrudates about 1/4 inch in diameter and 1/2 inch in length. This material was mixed with 213 grams of sodium silicate and aged at room temperature for a period of 24 hours.

At the end of this time, a solution prepared to contain 20 grams of sodium hydroxide, 350 grams of sodium silicate, and 350 grams of deionized water was prepared and mixed with the extruded clay. The slurry was mixed rapidly. A 40 ml. portion of the slurry of nucleation centers prepared according to the process described in Example 2 was added. The mixture was heated to 105° C. for 48 hours. The material was filtered, washed and a small sample was calcined at 1000° F. The extrudates had a surface area of 650 square meters per gram. The X-ray diffraction pattern of the product showed it had the faujasite structure.

EXAMPLE 7

This example illustrates the preparation of a zeolite having a silica to alumina ratio of about 2 from kaolin clay.

A total of 33.3 grams of calcined kaolin clay was mixed with a solution containing 13.5 grams of sodium hydroxide in 20 grams of water. A total of 10 ml. of the nucleation center slurry prepared according to the process described in Example 2 was added. The mixture was transferred to a laboratory balling machine and formed into spheres having a diameter of 1/8 to 1/4 of an inch. The spheres formed were allowed to dry overnight. The dried spheres were placed in a container and 50 ml. of deionized water was added. The mixture was then heated to 105° C. to crystallize.

After 24 hours at 105° C. the nodules were filtered and washed. A sample of the spheres was crushed and dried at 100° C. for X-ray analysis. The X-ray diffraction pattern showed the product was Type A zeolite. The zeolite was found to have a water adsorption of 22.1% at 10% relative humidity. A portion of the material was crushed and exchanged with a 10% solution of calcium chloride. Two exchanges were made. The zeolite was in contact with the calcium chloride solution for periods of 30 minutes during each exchange. The exchanged material was calcined at 1000° F. and found to adsorb 11.5% butane at 760 mm. pressure.

The spheres were found to have an average crushing strength in excess of 30 lbs.

What is claimed is:

1. A process for preparing crystalline aluminosilicates having the faujasite crystal structure in the form of nodules having a diameter of greater than 200 microns and a crush strength of at least 10 pounds which comprises:
    (a) adding a sufficient quantity of metakaolin to a sodium silicate solution to wet the metakaolin,
    (b) forming the metakaolin into nodules,
    (c) preparing a slurry of amorphous nucleation centers having a particle size of between 0.01 to 0.05 microns prepared from a slurry containing $Na_2O$, $Al_2O_3$, and $SiO_2$,
    (d) adding said nucleation centers to a sodium silicate-sodium hydroxide solution,
    (e) digesting said nodules with said sodium silicate-sodium hydroxide-nucleation center slurry at a temperature of about 180° to 220° F. until crystallization to the zeolite is complete, and
    (f) washing, drying, and recovering the nodular zeolites.

2. The process according to claim 1 wherein the zeolite product has the faujasite structure of a silica to alumina ratio of 2.5 to 5 and the nodules are digested at a temperature of about 180 to 220° F. in a silicate solution in a concentration such that the molar ratios of reactants are as follows:

| | |
|---|---|
| $Na_2O/SiO_2$ | 0.4–6 |
| $SiO_2/Al_2O_3$ | 3–25 |
| $H_2O/Na_2O$ | 20–50 |

References Cited

UNITED STATES PATENTS

| 3,472,617 | 10/1969 | McDaniel et al. | 23—112 |
| 3,321,272 | 5/1967 | Kerr | 23—113 |
| 3,574,538 | 4/1971 | McDaniel et al. | 423—329 |

CARL F. DEES, Primary Examiner

U.S. Cl. X.R.

252—455 Z; 423—329